(12) United States Patent
Her

(10) Patent No.: US 6,404,816 B1
(45) Date of Patent: Jun. 11, 2002

(54) DEVICE AND METHOD FOR TRANSPOSING MATRIX OF VIDEO SIGNAL AND T.V. RECEIVER EMPLOYING THE SAME

(75) Inventor: Won Jun Her, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/940,533

(22) Filed: Aug. 29, 2001

Related U.S. Application Data

(62) Division of application No. 08/994,543, filed on Dec. 19, 1997.

(30) Foreign Application Priority Data

Dec. 20, 1996 (KR) .............................. 96-68798

(51) Int. Cl.$^7$ ................................................ H04N 7/12
(52) U.S. Cl. ............................ 375/240.25; 375/240.18; 375/240.2
(58) Field of Search ....................... 375/240.18, 240.2, 375/240.25; 348/403.1, 408.1, 725; 382/348, 250; 708/400, 402, 406–407, 520–522; 365/78, 189.12

(56) References Cited

U.S. PATENT DOCUMENTS

| | | | |
|---|---|---|---|
| 4,769,790 A | 9/1988 | Yamashita | 365/189.12 |
| 4,903,231 A | 2/1990 | Artieri | 711/1 |
| 4,908,874 A | 3/1990 | Gabriel | 382/248 |
| 5,031,038 A * | 7/1991 | Guillemot et al. | 375/240.2 |
| 5,226,002 A | 7/1993 | Wu et al. | 708/607 |
| 5,267,185 A | 11/1993 | Akabane et al. | 708/520 |
| 5,291,429 A * | 3/1994 | Iwama et al. | 708/402 |
| 5,418,487 A | 5/1995 | Armstrong, II | |
| 5,481,487 A | 1/1996 | Jang et al. | 264/725.01 |
| 5,550,765 A | 8/1996 | Bhattacharya et al. | 364/725.01 |
| 5,805,746 A | 9/1998 | Kim et al. | 364/715.011 |
| 5,815,421 A | 9/1998 | Dulong et al. | 364/736.03 |
| 5,854,757 A | 12/1998 | Dierke | 364/725.03 |
| 5,867,601 A | 2/1999 | Phillips | 382/250 |
| 6,021,420 A | 2/2000 | Takamuki | 708/401 |
| 6,026,217 A | 2/2000 | Adiletta | 395/200.77 |
| 6,064,404 A | 5/2000 | Aras et al. | 345/507 |

FOREIGN PATENT DOCUMENTS

| | | |
|---|---|---|
| JP | 5073669 | 3/1993 |
| JP | 8205147 | 8/1996 |

OTHER PUBLICATIONS

Tierno et al., "Asynchronous transpose–matrix architectures", ICCD '97, Computer Design: VLSI in Computers and Processors, IEEE, Oct. 1997, pp. 423–428.*

Choi et al., "A 400 MPixel/s IDCT for HDTV by multibit coding and group symmetry", 43$^{rd}$ ISSCC, Solid–State Circuits Conference, IEEE, Feb. 1997, pp. 262–263.*

* cited by examiner

*Primary Examiner*—Vu Le
(74) *Attorney, Agent, or Firm*—Birch, Stewart, Kolasch & Birch, LLP

(57) ABSTRACT

Device and method for transposing a matrix of video signals, is disclosed, the device including a memory part, a write control circuit for shifting and writing rows of the matrix of video signals on the memory part by any one unit either of a row unit or column unit, and a read control circuit for shifting and reading the matrix of video signals stored in the memory part by one unit different from the unit in the writing either of the row unit or the column unit, with rows of a matrix of video signal received at the next time written on a portion of the memory part emptied due to the shift in the reading.

24 Claims, 12 Drawing Sheets

FIG.5A $$\begin{pmatrix} 0 & 1 & 2 & 3 & 4 & 5 & 6 & 7 \\ 8 & 9 & 10 & 11 & 12 & 13 & 14 & 15 \\ 16 & 17 & 18 & 19 & 20 & 21 & 22 & 23 \\ 24 & 25 & 26 & 27 & 28 & 29 & 30 & 31 \\ 32 & 33 & 34 & 35 & 36 & 37 & 38 & 39 \\ 40 & 41 & 42 & 43 & 44 & 45 & 46 & 47 \\ 48 & 49 & 50 & 51 & 52 & 53 & 54 & 55 \\ 56 & 57 & 58 & 59 & 60 & 61 & 62 & 63 \end{pmatrix}$$

FIG.5B $$\begin{pmatrix} 0 & 8 & 16 & 24 & 32 & 40 & 48 & 56 \\ 1 & 9 & 17 & 25 & 33 & 41 & 49 & 57 \\ 2 & 10 & 18 & 26 & 34 & 42 & 50 & 58 \\ 3 & 11 & 19 & 27 & 35 & 43 & 51 & 59 \\ 4 & 12 & 20 & 28 & 36 & 44 & 52 & 60 \\ 5 & 13 & 21 & 29 & 37 & 45 & 53 & 61 \\ 6 & 14 & 22 & 30 & 38 & 46 & 54 & 62 \\ 7 & 15 & 23 & 31 & 39 & 47 & 55 & 63 \end{pmatrix}$$

FIG.5C

| 7 | 6 | 5 | 4 | 3 | 2 | 1 | 0 |
|---|---|---|---|---|---|---|---|
| ↓ | ↓ | ↓ | ↓ | ↓ | ↓ | ↓ | ↓ |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |

FIG.5D

| 63 | 62 | 61 | 60 | 59 | 58 | 57 | 56 |
|----|----|----|----|----|----|----|----|
| 55 | 54 | 53 | 52 | 51 | 50 | 49 | 48 |
| 47 | 46 | 45 | 44 | 43 | 42 | 41 | 40 |
| 39 | 38 | 37 | 36 | 35 | 34 | 33 | 32 |
| 31 | 30 | 29 | 28 | 27 | 26 | 25 | 24 |
| 23 | 22 | 21 | 20 | 19 | 18 | 17 | 16 |
| 15 | 14 | 13 | 12 | 11 | 10 | 9  | 8  |
| 7  | 6  | 5  | 4  | 3  | 2  | 1  | 0  |

FIG.5E

| 63 | 62 | 61 | 60 | 59 | 58 | 57 | 56 |
|----|----|----|----|----|----|----|----|
| 55 | 54 | 53 | 52 | 51 | 50 | 49 | 48 |
| 47 | 46 | 45 | 44 | 43 | 42 | 41 | 40 |
| 39 | 38 | 37 | 36 | 35 | 34 | 33 | 32 |
| 31 | 30 | 29 | 28 | 27 | 26 | 25 | 24 |
| 23 | 22 | 21 | 20 | 19 | 18 | 17 | 16 |
| 15 | 14 | 13 | 12 | 11 | 10 | 9  | 8  |
| 7  | 6  | 5  | 4  | 3  | 2  | 1  | 0  |

FIG.5F

| 7 | 63 | 62 | 61 | 60 | 59 | 58 | 57 | 56 |
|---|----|----|----|----|----|----|----|----|
| 6 | 55 | 54 | 53 | 52 | 51 | 50 | 49 | 48 |
| 5 | 47 | 46 | 45 | 44 | 43 | 42 | 41 | 40 |
| 4 | 39 | 38 | 37 | 36 | 35 | 34 | 33 | 32 |
| 3 | 31 | 30 | 29 | 28 | 27 | 26 | 25 | 24 |
| 2 | 23 | 22 | 21 | 20 | 19 | 18 | 17 | 16 |
| 1 | 15 | 14 | 13 | 12 | 11 | 10 | 9  | 8  |
| 0 | 7  | 6  | 5  | 4  | 3  | 2  | 1  | 0  |

FIG.5G

| 63 | 55 | 47 | 39 | 31 | 23 | 15 | 7 |
|----|----|----|----|----|----|----|---|
| 62 | 54 | 46 | 38 | 30 | 22 | 14 | 6 |
| 61 | 53 | 45 | 37 | 29 | 21 | 13 | 5 |
| 60 | 52 | 44 | 36 | 28 | 20 | 12 | 4 |
| 59 | 51 | 43 | 35 | 27 | 19 | 11 | 3 |
| 58 | 50 | 42 | 34 | 26 | 18 | 10 | 2 |
| 57 | 49 | 41 | 33 | 25 | 17 | 9  | 1 |
| 56 | 48 | 40 | 32 | 24 | 16 | 8  | 0 |

FIG.5H

| 7  | 6  | 5  | 4  | 3  | 2  | 1  | 0 |
|----|----|----|----|----|----|----|---|
| 63 | 55 | 48 | 39 | 31 | 23 | 15 | 7 |
| 62 | 54 | 47 | 38 | 30 | 22 | 14 | 6 |
| 61 | 53 | 46 | 37 | 29 | 21 | 13 | 5 |
| 60 | 52 | 45 | 36 | 28 | 20 | 12 | 4 |
| 59 | 51 | 44 | 35 | 27 | 19 | 11 | 3 |
| 58 | 50 | 43 | 34 | 26 | 18 | 10 | 2 |
| 57 | 49 | 42 | 33 | 25 | 17 | 9  | 1 |
| 56 | 48 | 41 | 32 | 24 | 16 | 8  | 0 |

FIG.7A $$\begin{pmatrix} 0 & 1 & 2 & 3 & 4 & 5 & 6 & 7 \\ 8 & 9 & 10 & 11 & 12 & 13 & 14 & 15 \\ 16 & 17 & 18 & 19 & 20 & 21 & 22 & 23 \\ 24 & 25 & 26 & 27 & 28 & 29 & 30 & 31 \end{pmatrix}$$

FIG.7B $$\begin{pmatrix} 0 & 8 & 16 & 24 \\ 1 & 9 & 17 & 25 \\ 2 & 10 & 18 & 26 \\ 3 & 11 & 19 & 27 \\ 4 & 12 & 20 & 28 \\ 5 & 13 & 21 & 29 \\ 6 & 14 & 22 & 30 \\ 7 & 15 & 23 & 31 \end{pmatrix}$$

FIG.7C

| 6 | – | | | |
|---|---|---|---|---|
| 4 | – | | | |
| 2 | – | | | |
| 0 | – | | | |

| 7 | – | | | |
|---|---|---|---|---|
| 5 | – | | | |
| 3 | – | | | |
| 1 | – | | | | after 4 cycle →

FIG.7D

| 30 | 22 | 14 | 6 |
|----|----|----|---|
| 28 | 20 | 12 | 4 |
| 26 | 18 | 10 | 2 |
| 24 | 16 | 8  | 0 |

| 31 | 23 | 15 | 7 |
|----|----|----|---|
| 29 | 21 | 13 | 5 |
| 27 | 19 | 11 | 3 |
| 25 | 17 | 9  | 1 |

FIG.7E

| 30 | 22 | 14 | 6 |
|----|----|----|---|
| 28 | 20 | 12 | 4 |
| 26 | 18 | 10 | 2 |
| 24 | 16 | 8  | 0 |

| 31 | 23 | 15 | 7 |
|----|----|----|---|
| 29 | 21 | 13 | 5 |
| 27 | 19 | 11 | 3 |
| 25 | 17 | 9  | 1 |

FIG.7F

| 6  | 4  | 2  | 0 |
|----|----|----|---|
| 30 | 22 | 14 | 6 |
| 28 | 20 | 12 | 4 |
| 26 | 18 | 10 | 2 |

24 16 8 0

| 7  | 5  | 3  | 1 |
|----|----|----|---|
| 31 | 23 | 15 | 7 |
| 29 | 21 | 13 | 5 |
| 27 | 19 | 11 | 3 |

| 30 | 28 | 26 | 24 |
|----|----|----|----|
| 22 | 20 | 18 | 16 |
| 14 | 12 | 10 | 8  |
| 6  | 4  | 2  | 0  |

| 31 | 29 | 27 | 25 |
|----|----|----|----|
| 23 | 21 | 19 | 17 |
| 15 | 13 | 11 | 9  |
| 7  | 5  | 3  | 1  |

FIG.7H

| 6 | 30 | 28 | 26 | 24 |
|---|----|----|----|----|
| 4 | 22 | 20 | 18 | 16 |
| 2 | 14 | 12 | 10 | 8  |
| 0 | 6  | 4  | 2  | 0  |

| 7 | 31 | 29 | 27 | 25 |
|---|----|----|----|----|
| 5 | 23 | 21 | 19 | 17 |
| 3 | 15 | 13 | 11 | 9  |
| 1 | 7  | 5  | 3  | 1  |

DEVICE AND METHOD FOR TRANSPOSING MATRIX OF VIDEO SIGNAL AND T.V. RECEIVER EMPLOYING THE SAME

This application is a divisional of co-pending application Ser. No. 08/994,543, filed on Dec. 19, 1997, the entire contents of which are hereby incorporated by reference and for which priority is claimed under 35 U.S.C. §120; and this application claims priority of Application No. 68798/1996 filed in Korea on Dec. 20, 1996 under 35 U.S.C. §119.

BACKGROUND OF THE INVENTION

1. Field of the Invention

The present invention relates to a device and a method for transposing a matrix of video signals, which may be applied to a video decoder for decoding a matrix of compressed video bitstream such as signals of an MPEG(Moving Picture Expert Group) format.

2. Discussion of the Related Art

As is well known, recently high definition television (HDTV) broadcasting systems have been developed, some of which are put into pilot operation in some of countries. In the pilot operation of the HDTV broadcasting systems, signals according to the HDTV broadcasting systems are transmitted, which are capable of being processed in an HDTV receiver (hereinafter called as HDTV). In the meantime, there are two classes of signals in the HDTV system of the ATSC (Advanced Television Systems Committee) of the U.S.A. One class of signal is an HD class signal for producing images of a high definition, and the other class of signal is an SD (Standard Definition) class signal(hereinafter called as SD signal) for producing images of a standard definition. The SD class signal has a data transmission rate lower than the HD class signal. The HD TV is adapted to process the two classes of video data, basically. Therefore, there can be four cases of signal transmission between broadcasting stations and HD TV's; the first case is displaying a HD signal as an HD signal, the second case is displaying an HD signal as an SD signal, the third case is displaying an SD signal as HD class signal, and the fourth is displaying an SD signal as an SD signal. Though the first, third and fourth cases have no particular problems in processing the signals with regard to the system performances, the second case does. That is, the second case has problem in that the images appear broken. Therefore, if an HD signal is to be displayed as an SD class signal, it is necessary to degrade performance of a received HD signal to some extent. For example, an HD signal of 20 MHz MPEG format should be altered to an SD class signal of 6 MHz MPEG format. This degradation of the HD signal performance implies a drop in the resolution. In general, the HD signal performance is degraded by removing a portion of frequency band over a certain frequency from the HD signal. An HD signal of an 8×8 matrix having a portion of frequency band over a certain frequency removed therefrom to suit to the SD class signal is thereby altered into an 8×4 HD signal. This 8×4 HD signal can be displayed as an SD class signal, with a resolution degraded compared to the 8×8 HD signal, but without the problem of broken images. In the meantime, an 8×8 matrix SD signal can be displayed on an HDTV as it is. Because of the aforementioned reason, the HD TV should be adapted to process the 8×8 HD signal as well as the 8×4 HD signal. A general HD TV will be explained with reference to FIGS. 1~3.

Referring to FIG. 1, upon receiving a compressed video bit stream from a broadcasting station, the general HD TV synchronizes a desired video bitstream in a tuner 10, of the video bitstream received through an antenna Ant, and demodulates in a demodulator 20. This video bitstream, being an MPEG signal, has a form of matrix. Then, the demodulated video bit stream is restored in a video decoder 30 and processed to a displayable condition in a VDP(Video Display Processor) 40. The signal from the VDP 40 is displayed through a displayer 50. In this instance, the VDP 40 processes the decoded signals appropriate to a performance of the displayer 50.

FIG. 2 illustrates a detail block diagram of the video decoder 30 shown in FIG. 1. Upon reception of a matrix of the demodulated video bit stream from the demodulator 20 in FIG. 1, a VLD(Variable Length Decoder) 21 therein decodes the demodulated video bit stream to provide DCT (Discrete Cosine Transform) coefficients and motion vectors. The DCT coefficients are scanned by an inverse scanner 22 and inverse quantized by the inverse quantizer 23. Then, an IDCT(Inverse Discrete Cosine Transformer) 25 makes an inverse discrete cosine transformation of the inverse quantized DCT coefficients to provide spatial pixel values. Here, before the inverse discrete cosine transformation in the IDCT 25, the inverse quantized DCT coefficients are transposed in a transposer 24 for easy inverse discrete cosine transformation. On the other hand, a motion compensator 27 uses the motion vectors from the VLD 21 in compensating a reference video frame stored in the frame memory in advance, and an adder 28 adds a signal from the motion compensator 27 and a signal from the IDCT 25, to provide an added value to the VDP 40 in FIG. 1.

Illustrated in FIG. 3 is an example of the transposer 24 for making alternative read/write of two memories 24a and 24b in transposing them.

Referring to FIG. 3, the transposer 24 is provided with two SRAM(Static Random Access Memory) 24a and 24b each of a 16 bits×64 words size and two multiplexed flipflops 24d and 24e. Upon reception of an enable signal in a read/write controller 24c, the read/write controller 24c provides a read/write controlling signal and a selecting signal to the first SRAM 24a and the second SRAM 24b. . The first SRAM 24a and the second SRAM 24b are operative in opposite manner in response to the read/write controlling signal. That is, a first data is written on the first SRAM 24a at the first time, the second SRAM 24b is left at a disabled state in response to the selecting signal. Then, while the first SRAM 24a is read, the second a SRAM 24b is written of a second data. Thus, the first SRAM 24a and the second SRAM 24b are read and written alternatively. The alternative first, second data from the two SRAMs 24a and 24b are transposed by the multiplexed flipflops 24d and 24e. Besides, there are a transposing method disclosed in a U.S Pat. No. 4,769,790 by time delaying and a U.S. Pat. No. 5,418,487 using dual port memories. These two Patents have a disadvantages either in a size of hardware or in a complicated hardware. And, as has been explained, the background art transposer 24 shown in FIG. 2 transposes an m×m matrix signal(for example, m=8) using two memories of m×m words capacity each. Because of the use of two memories, such a background art transposer has disadvantages in that the inverse discrete cosine transformer and the video decoder 30 shown in FIG. 2 have increased areas and comparatively low operation speed of 100 M sample/sec.

SUMMARY OF THE INVENTION

Accordingly, the present invention is directed to device and method for transposing a matrix of video signals and a television receiver employing the same that substantially obviates one or more of the problems due to limitations and disadvantages of the related art.

An object of the present invention is to provide a method and a device for transposing a matrix of video signals which can reduce a chip area of the inverse discrete cosine transformer and, further, an area of the video decoder.

Another object of the present invention is to provide a method and a device for transposing a matrix of video signals which is operable at fast speed.

Other object of the present invention is to provide a video decoder and a television receiver employing the same method and device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a memory part for writing a matrix of video signals thereon, a write control circuit shift and writes rows of the video signals on the memory part by any one unit either of a row unit or a column unit. The video signals written on the memory are read from the memory by one unit different from the unit in the writing either of the row unit and the column unit by a read control circuit for transposing. Rows of video signals received at the next time are shifted, and written on portions of the memory part emptied in sequence due to the shift in the reading by one unit opposite to the unit in the reading either of the row unit and the column unit in sequence. The memory part may includes either one memory on which the matrix of video signals may be written or two memory of less capacity, resulting to a reduction of an occupied area of the memory part. Because rows of video signals received at the next time is shifted, and written on portions of the memory part emptied in sequence in the reading, a speed of the transposing becomes faster.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 5A~5H illustrate the steps of a process for transposing a matrix of video signals in accordance with the first preferred embodiment of the present invention;

FIGS. 7A~7H illustrate the steps of a process for transposing a matrix of video signals in accordance with the second preferred embodiment of the present invention;

DETAILED DESCRIPTION OF THE PREFERRED EMBODIMENT

Reference will now be made in detail to the preferred embodiments of the present invention, examples of which are illustrated in the accompanying drawings.

FIRST EMBODIMENT

Figure 1:
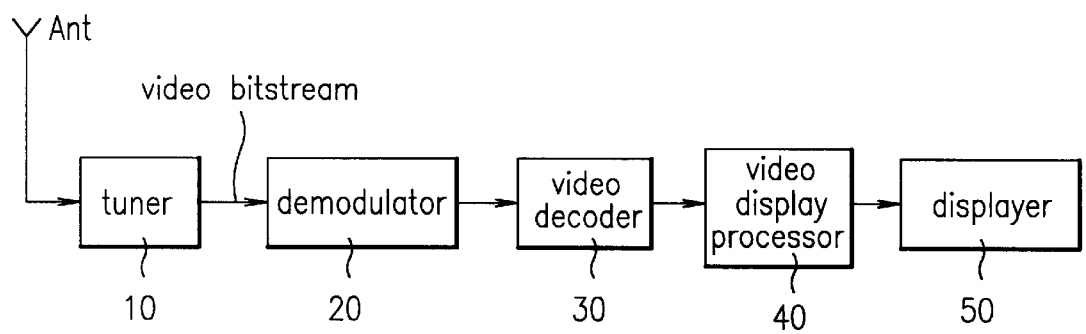
FIG. 1 illustrates a block diagram showing a system of a general HD TV, schematically.
Figure 2:
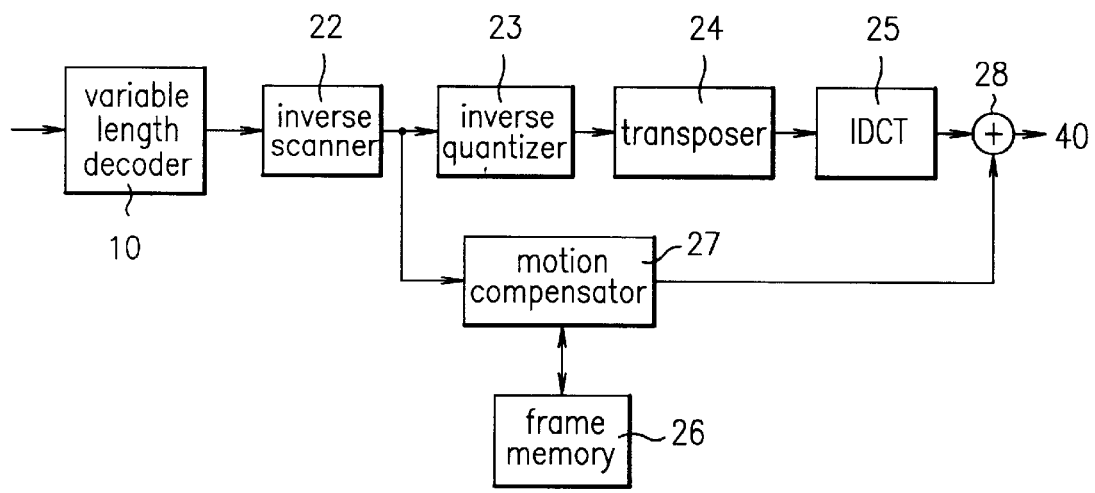
FIG. 2 illustrates a block diagram showing a system of a general video decoder.
Figure 3:
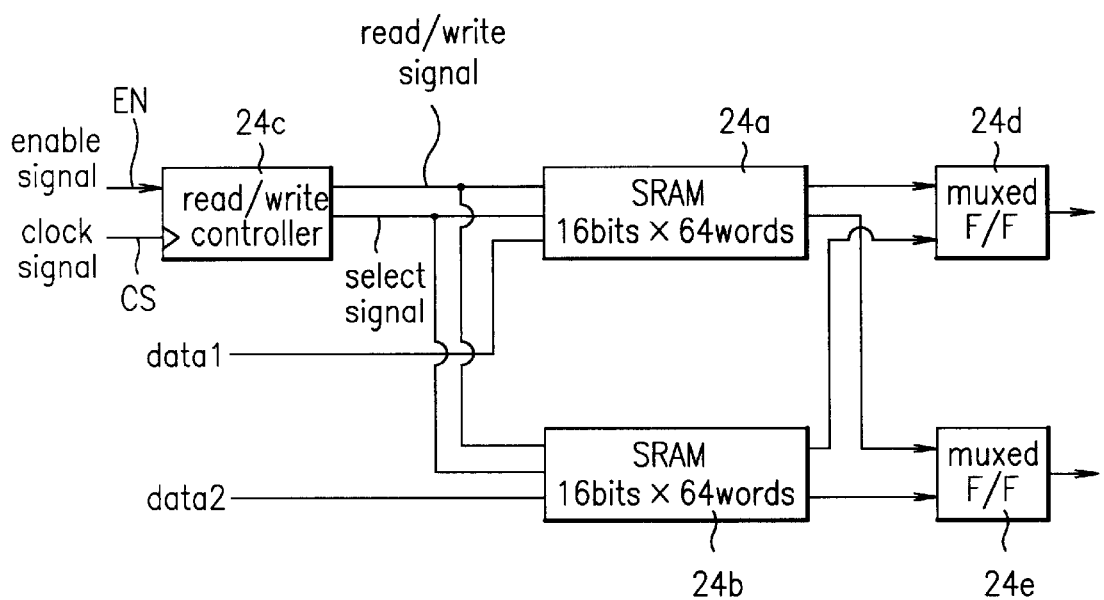
FIG. 3 illustrates a block diagram showing a system of a general transposer.
Figure 4:
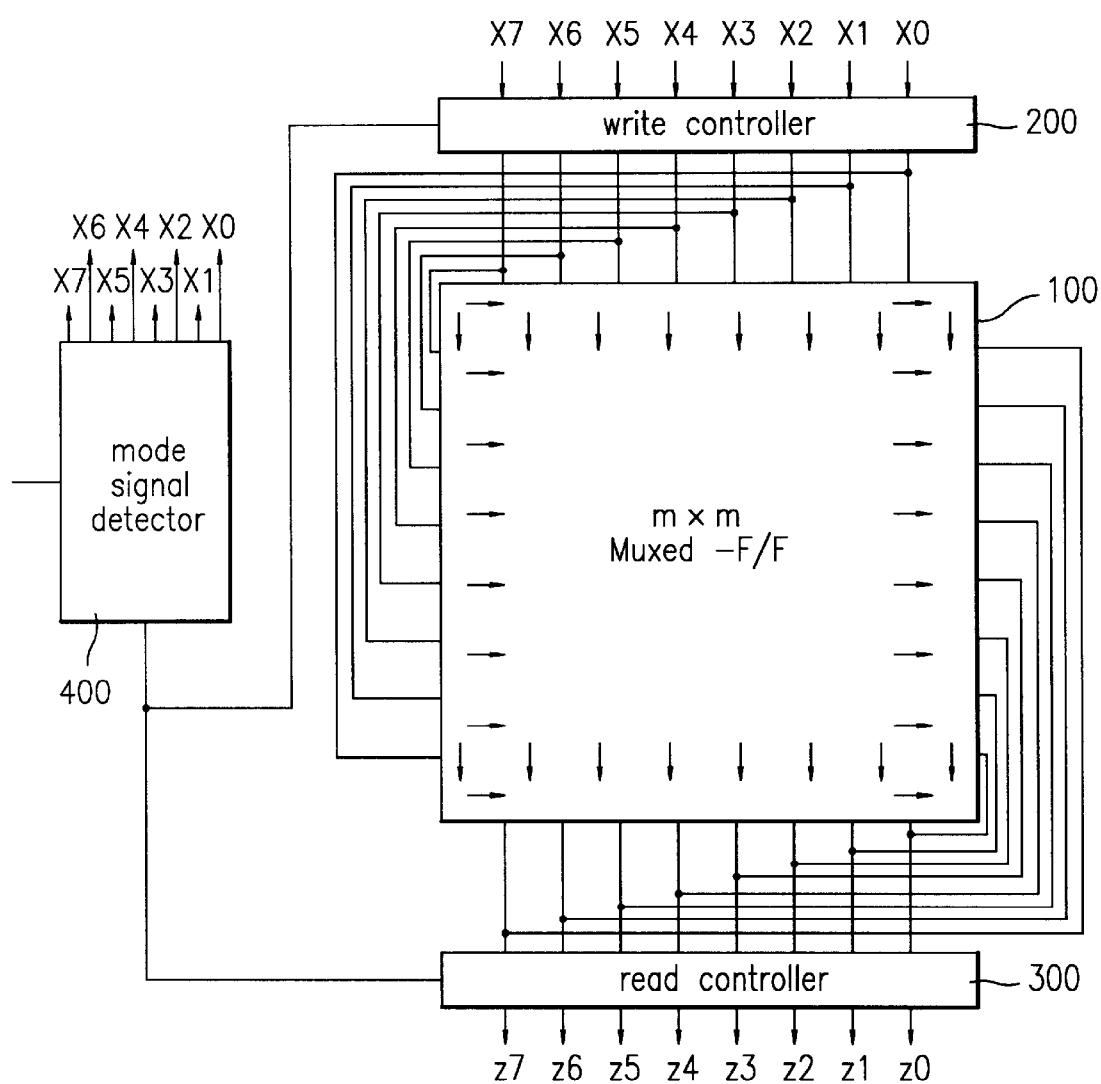
FIG. 4 illustrates a block diagram showing a system of a transposer in accordance with a first preferred embodiment of the present invention.

FIG. 4 illustrates a block diagram showing a system of a transposer in accordance with a first preferred embodiment of the present invention. The transposer includes a memory part 100, a write control circuit 200, a read control circuit 300 and a mode signal detecting circuit 400. The memory part 100 may include either multiplexed flipflops capable of writing m×m video signals thereon or an SRAM using a register file and a cell compiler. The mode signal detecting circuit 400 determines a received matrix of video bitstream of being 8×8 signals or 8×4 signals and provides a relevant mode signal to the write control circuit 200 and read control circuit 300. As explained, since the HD TV is adapted to suit to an SD signal, the HD TV is required to reduce a performance of received 8×8 HD signals to 8×4 HD signals to suit to the SD signal. Accordingly, a first embodiment transposer is designed to be capable of transposing both the 8×8 video signals and the 8×4 video signals. The operation of the transposer of the present invention will be explained, briefly.

First, the write control circuit 200 shifts, and writes all rows of the received matrix of signals on the memory part 100 by any one unit either of a row unit or a column unit to a first direction. The read control circuit shifts, and reads the matrix of signals stored in the memory part 100 by any one unit either of a row unit or a column unit different from the unit in the writing to a second direction. In the meantime, vacant spaces in the memory part 100 caused by the shifting in the reading are filled with an identical matrix of the next video signals received successively, with the video signals shifted by the same unit as the reading to the second direction. In this instance, if the writing is made by a row unit and reading is made by a column unit, the first direction is a top to bottom direction of the memory part 100 and the second direction is a left to right direction of the memory part 100. And, if the writing is made by a column unit and reading is made by a row unit, the first direction is the left to right direction of the memory part 100 and the second direction is the top to bottom direction of the memory part 100. When a sequence of lines connecting the write control circuit 200 and the read control circuit 300 to the memory 100 is changed to an opposite fashion, the first direction is a right to left direction and the second direction is a bottom to top direction.

The matrix of video signals may either be m×m(m=an positive integer) or m×m/2(m=a positive even numeral). In general, a received HD signal and SD signal may be either a matrix of 8×8 signals or a matrix of 8×4 signals. The operation of the transposer shown in FIG. 4 will be explained for the case when the 8×8 video bitstream or the 8×4 video bitstream is received, separately. First, the case when rows of the received 8×8 video signals are written by a row unit on the memory 100 will be explained with reference to FIGS. 5A to 5H. In this instance, it is assumed that the memory 100 has a size of 8×8 memory 100. FIG. 5A shows received 8×8 video signals, and FIG. 5B shows finally transposed 8×8 video signals.

First, referring to FIGS. 5C and 5D, when the 8×8 video signals are received in the 8×8 memory 100, the write control circuit 200 shifts, and writes all the 8 rows of the 8×8 video signals on the 8×8 memory by one row unit in sequence from the bottom row to the top row of the 8×8 memory 200 at every clock, writing the 8 signals in each of the rows of the 8×8 video signals from the right end to the leftend of each row in the 8×8 memory 100. That is, 8 data are written at every clock, to complete writing of the 8×8 video signals after 8 cycles. Then, as shown in FIGS. 5E and 5F, all the 8×8 video signals written on the 8×8 memory 100 are read under the control of the read control circuit 300, with the 8×8 video signals shifted to right side by a column unit, which is different from the unit in writing, in sequence from right end to left end. In this instance, the 8 signals in each of the columns on the 8×8 memory 100 are read from the bottom to the top of each column in the 8×8 memory 100 in sequence. In the meantime, the columns emptied in sequence from the left end of the 8×8 memory 100 due to the signal shift during the reading are filled with the rows of the 8×8 video signals received at the next time from the top end row to the bottom end row in sequence under the control of the write control circuit 300. In this instance, the 8 signals in each of the rows are written on each of the emptied columns in the 8×8 memory 100 from the bottom to the top. Then, as shown in FIGS. 5G and 5H, the 8×8 video signals written by a column unit are read shifted by a row unit in bottom direction, and the rows in the 8×8 memory 100 emptied started from the top during the reading are filled with the rows of the next 8×8 video signals, shifted in sequence. Thus, the 8×8 video signals written on the 8×8 memory 100 are transposed when they are read out of the memory 100.

Next, the case when 8 rows of received 8×8 video signals are written on the 8×8 memory 100 by a column unit will be explained. In this case, since what is required is only a simple change of the units in the writing at an initial operation, this operation will be explained without any reference to attached drawings. All the 8 rows in the 8×8 signals are written on the 8×8 memory 100 by a column unit, shifting by a column from the right end column to the left end column in the 8×8 memory 100 in sequence. In this instance, the 8 signals in each of the rows are written from bottom to top of each column of the 8×8 memory 100. The 8×8 video signals written on the 8×8 memory 100 are read by a row unit, shifting by one row, from the bottom end row to the top end row in sequence. In this instance, the 8 signals in each of the rows are read from the right side to the left side. In the meantime, the rows emptied in sequence from the top end of the 8×8 memory are filled with the rows of the 8×8 video signals received at the next time shifted from the top end row to the bottom end row in sequence, with the 8 signals in each of the rows written from the right end to the left end of each emptied row in the 8×8 memory 100.

Though the above explanation is given for the case when the memory 100 is an m×m memory and the received video signal is also m×m as an example, it is applicable to a case when the received video signal is smaller than m×m(for example, m×m/2). In this case, both the write control circuit 200 and the read control circuit 300 are adapted to control only an m×m/2 region of the m×m memory region. In this instance, the rest of the memory is left void. In this first embodiment, the video signals are read or written from the right column to the left column and from the bottom row to the top row. And, the video signals are written or read from the right end to the left end of each row and from the bottom end to the top end of each column. However, this sequence shows an example, and the video signals may be processed in the opposite sequence. That is, the video signals are read or written from the left column to the right column and from the top row to the bottom row. And, the video signals are written or read from the left end to the right end of each row and from the top end to the bottom end of each column.

SECOND EMBODIMENT

Figure 6:
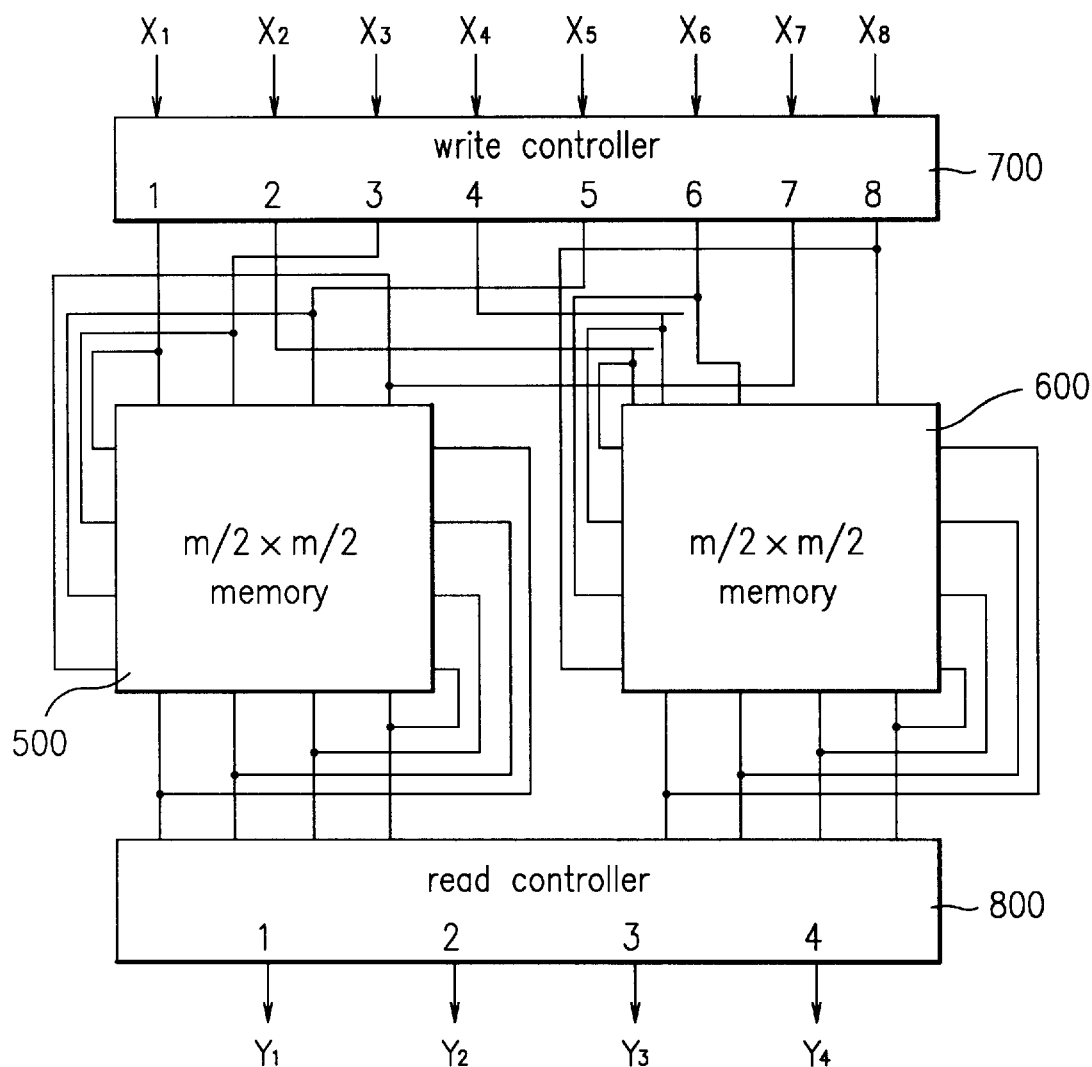
FIG. 6 explains a transposing of video signals within a matrix in accordance with the second preferred embodiment of the present invention.

A transposing method in accordance with a second embodiment of the present invention will be explained. FIG. 6 illustrates a block diagram of the second embodiment transposer. The transposer includes two m/2×m/2 memories (for example, 4×4 memories) 500 and 600, a write control circuit 700 and a read control circuit 800. Because the second embodiment transposer is provided to transpose only the m×m/2 video signals, particularly 8×4 video signals, the mode signal detecting circuit of the first embodiment is not required.

First, a case when the rows of the 8×4 signals are written on the memories 500 and 600 by a column unit will be explained with reference to FIGS. 7A to 7H. FIG. 7A illustrates 8×4 video signals to be transposed, and FIG. 7B illustrates 8×4 video signals transposed. As shown in FIGS. 7C and 7D, upon reception of the 8×4 video signals, the write control circuit 700 classifies the received 8×4 video signals into a first 4×4 video signals of four odd numbered columns and a second 4×4 video signals of four even numbered columns. Then, rows of the first 4×4 video signals and the second 4×4 video signals are written on the first 4×4 memory 500 and the second 4×4 memory 600 of the two memories 500 and 600 by a column unit shifting from a right end column to a left end column in sequence, respectively. In this instance, the four video signals in each row are written from a bottom end to a top end of each column of the 4×4 memories 500 and 600. As the 8×4 video signals have four rows, the write control circuit 700 writes all the 8×4 video signals on the two 4×4 memories 500 and 600 in 4 cycles, 8 data at every clock signal. Then, as shown in FIGS. 7E and 7F, the read control circuit 800 reads the first 4×4 video signals and the second 4×4 video signals written on the first 4×4 memory 500 and the second 4×4 memory 600 from a top end row to a bottom end row of each of the memories 500 and 600, shifting by a row unit in sequence. The video signals are read alternating in the order of the second 4×4 memory 600 and the first 4×4 memory 500, with the four video signals in each row in each of the memories 500 and 600 read from the right end to the left end. In the meantime, the rows of the first 4×4 memory 500 and the second 4×4 memory 600 emptied in sequence from the top end to the bottom end due to the shift during the reading are filled with the first 4×4 video signals and the second video signals in the 8×4 video signals received at the next time respectively by the write control signal 700, shifting from the top end row to the bottom end row by a row unit in sequence. The 4 signals in each row are written from the right end to the left end of each emptied row of each of the memories 500 and 600. Then, as shown in FIGS. 7G and 7H, the video signals written by a row unit are read shifting by a column unit for transposing, and the columns emptied during the reading are filled with rows of the next 8×4 video signals shifted by a column unit in sequence.

Next, a case when the received 8×4 video signals are written by a row unit, initially. Since this case represents a case when the unit of the writing is changed from a column unit to row unit, this case will be explained briefly, without reference to any attached drawings.

First, upon reception of 8×4 video signals, the write control circuit 700 classifies the received 8×4 video signal into a first 4×4 video signals of odd numbered columns and a second 4×4 video signals of even numbered columns. Then, the write control circuit 700 writes each of the 4 rows of the first 4×4 video signals and the second 4×4 video signals on the first 4×4 memory 500 and the second 4×4 memory 600 respectively by a row unit shifting from the bottom end row to the top end row in sequence. The four signals in each row are written from the right end to the left end of each row of each of the 4×4 memories 500 and 600. Then, the read control circuit 800 reads the first 4×4 video signals and the second 4×4 video signals on the first 4×4 memory 500 and the second 4×4 memory 600 respectively, shifting from the right end column to the left end column of each of the memories 500 and 600 by a column unit in sequence. The second 4×4 memory 600 and the first 4×4 memory 500 are read alternatively in the order of the second 4×4 memory 600 and the first 4×4 memory 500, with the 4 signals in each column of each of the memories 500 and 600 read from the bottom end to the top end. And, the columns in the first 4×4 memory 500 and the second 4×4 memory 600 emptied from the left end column to the right end column due to the shift of the video signals during the reading are filled with rows of the first 4×4 video signals and the second 4×4 video signals of the received 8×4 video signals, shifted from the top end row signals to the bottom row in sequence. In this instance, the 4 signals in each row of the 4×4 video signals are written from the bottom end to the top end of the emptied columns of each of the memories 500 and 600.

Though the case when two 4×4 memories are used as the m/2×m/2 memories, is taken as an example in the case of reception of m×m/2 video signals in this second embodiment, other sizes of m/2×m/2(m is an even numeral) memories may be used for transposing m×m/2 video signals(m is a positive even numeral) of other size matrices. And, identical to the first embodiment, each of the 4×4 memories may includes any one of multiplexed flipflops, an SRAM or register files. And, as explained in the first embodiment, the video signals may be processed in a sequence opposite to the sequence explained above.

Figure 8A:
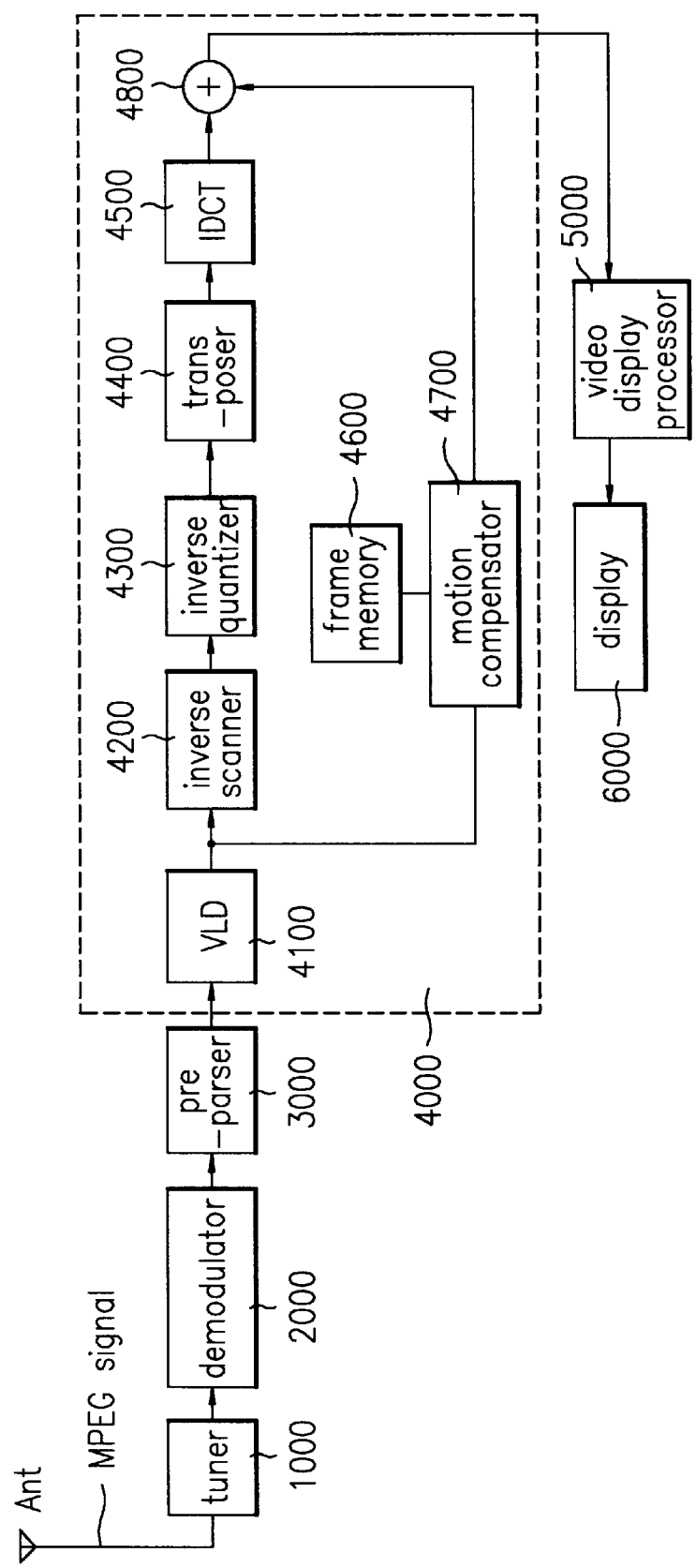
FIG. 8A illustrates a block diagram showing a first form of system of an HD TV having the transposer of the present invention applied thereto; and, FIG. 8B illustrates a block diagram showing a second form of system of an HD TV having the transposer of the present invention applied thereto.

FIG. 8A illustrates a block diagram showing an HDTV employing the transposer of the present invention. Referring to FIG. 8A, a tuner 1000 synchronizes, and receives a matrix of a compressed video bitstream of a channel of many channel signals received from an antenna ANT. The matrix of a compressed video bitstream synchronized by the tuner 1000 is demodulated by a demodulator 2000 and decoded by a video decoder 4000. Signal from the demodulator 2000 is passed through a pre-parser 3000 before decoded in the decoder 4000. As explained, since a general HDTV is adapted to suit to an SD signal, a received HD signal should be reduced of its performance to suit to the SD signal for preventing the problem of image breakage and the like. The pre-parser 3000 cuts a certain high frequency domain off the received HD signal for reducing performance of such an HD signal. That is, upon reception of an 8×8 HD signal from the demodulator 2000, the pre-parser 3000 removes a certain high frequency domain from the 8×8 HD signal, to provide 8×4 HD video signals. In the meantime, if the pre-parser 3000 receives 8×8 SD signals from the demodulator 2000, the pre-parser 3000 passes the 8×8 SD signals as they are. A VLD(Variable Length Decoder) 4100 in the video decoder 4000 decodes the demodulated video bitstream to provide a matrix of DCT(Discrete Cosine Transformation) coefficients and motion vectors. The matrix of DCT coefficients from the VLD 4100 are subjected to inverse scanning by an inverse scanner 4200, inverse quantizing by an inverse quantizer 4200, and transposing by a transposer 4400. Then, the transposed matrix of video signals are processed by an IDCT(Inverse Discrete Cosine Transformer) 4500 to produce spatial pixel values. A motion compensator 4700 compensates a reference frame stored in a frame memory 4600 using the motion vectors from the VLD 4100. The adder 4800 adds signals from the motion compensator 4700 and the IDCT 4500 and provided to a VDP(Video Display Processor) 5000. In the meantime, as has been explained, the transposer 4400 includes a memory part for storing the matrix of video signals from the inverse quantizer 4300, a write control circuit for writing the matrix of video signals from the inverse quantizer 4300 on the memory part shifting rows of the matrix of video signals by one unit either in a row unit or in a column unit in sequence, and a read control circuit for reading the matrix of video signals stored in the memory part shifting by one unit different from the unit in the writing in sequence. The write control circuit writes rows of the matrix of video signals from the inverse quantizer 4300 on the portion of the memory emptied by the shift during the reading shifting by, of the row unit and column unit, one unit identical to the unit in the reading in sequence. The VDP 5000 processes signal from the adder 4800 for display and provides the signal to a display 6000, such as a cathode ray tube or a liquid crystal display.

Figure 8B:
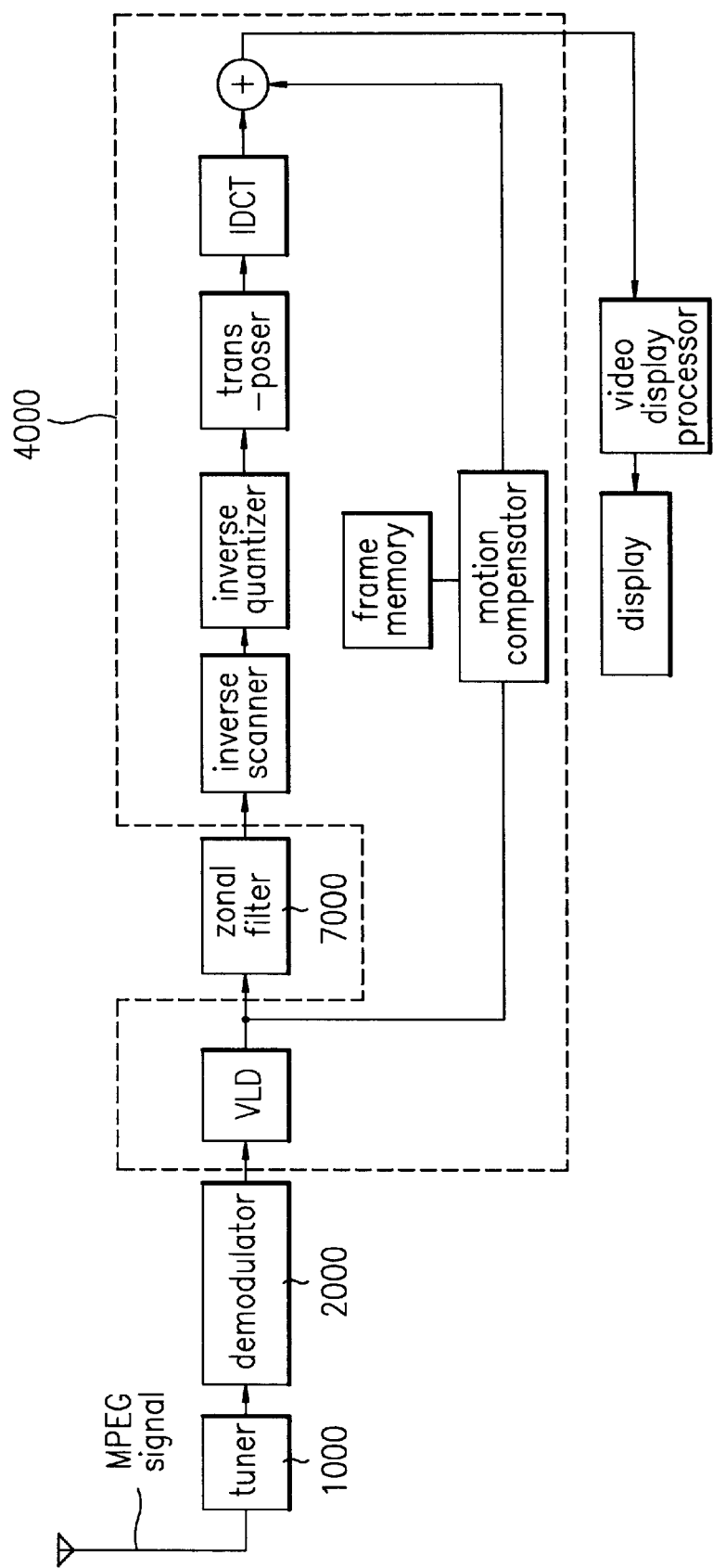

The video bitstream may be an MPEG signal for a HDTV broadcasting. And, as explained, the matrix of video bitstream may be m×m(m is a positive integer) signals, and the memory part may be a memory which can store the m×m signals. Particularly, the m×m signal may be 8×8 signals. Or, the received video bitstream may be m×m/2(m is a positive even numeral), and the memory part may includes two memories each of which can store m/2×m/2 signals. Particularly, the m×m/2 signals may be 8×4 signals, and the m/2×m/2 signals may be 4×4 signals. FIG. 8B illustrates a block diagram showing another system of an HDTV having the transposer of the present invention applied thereto. As shown in FIG. 8B, the system in FIG. 8B is identical to the system of FIG. 8A except for the use of a zonal filter 7000 instead of the preparser 3000. That is, the zonal filter 7000 is provided between the VLD 4100 and the inverse scanner 4200 instead of the pre-parser 3000 in FIG. 8A for removal of an unwanted high frequency domain from signal from the VLD 4100. Therefore, the zonal filter 7000 also has a function for altering the 8×8 HD signals into the 8×4 HD signals. Moreover, as explained, the memory part also includes any one of at least one multiplexed flipflop, at least one register file, and at least one SRAM.

As has been explained, because reading of a matrix of video signals and writing of the next matrix of video signals can be carried out on the same time, the device and method for transposing a matrix of video signals of the present invention can make IDCT in a video decoder faster. For example, an IDCT transpose block of 400 M sample/sec can be made available by the method of the present invention, where an IDCT transpose block of 100 M sample/sec can be made available by the background art method. Further, because what is required is only one memory of a 16 bits×64 bits size for realization of such a four time faster transpose block, the size of the memory block can be reduced significantly.

Even though the present invention has been explained taking an HDTV as an example in the aforementioned embodiments, the present invention can be applicable to a DVD and any devices involving the MPEG.

It will be apparent to those skilled in the art that various modifications and variations can be made in the device and method for transposing a matrix of video signals and a HDTV receiver employing the same of the present invention without departing from the spirit or scope of the invention. Thus, it is intended that the present invention cover the modifications and variations of this invention provided they come within the scope of the appended claims and their equivalents.

What is claimed is:

1. A video decoder, comprising:
    a variable length decoder(VLD) for decoding a received video bit stream in a form of a matrix to provide a matrix of discrete cosine transformation(DCT) coefficients and motion vectors;
    an inverse scanner for inverse scanning the matrix of DCT coefficients provided from the VLD;
    an inverse quantizer for inverse quantizing a signal from the inverse scanner;
    a transposter for transposing a matrix of signals from the inverse quantizer,
    the transposer including,
    a memory part,
    a mode signal detector for determining a matrix form of a signal from the inverse quantizer and providing a relevant mode signal,
    a write control circuit for writing the signals from the inverse quantizer on the memory part by any one unit either of a row unit or a column unit while shifting rows of the signals by the any one unit in sequence appropriately in response to the mode signal,
    a read control circuit for reading a matrix of signals written on the memory part by one unit different from the one unit in the writing either of the row unit or the column unit while shifting the matrix of signals by the one unit different from the one unit in the writing either of the row unit or the column unit in sequence,
    wherein the write control circuit writes the next signals from the inverse quantizer on a portion of the memory part emptied due to the shift in the reading by one unit identical to the one unit in the reading while shifting rows of the next signals by the one unit identical to the one unit in the reading in sequence;
    an inverse discrete cosine transformer(IDCT) for subjecting the transposed signals to inverse cosine transformation to provide spatial pixel values;
    a frame memory for storing a reference frame;
    a motion compensator for compensating the reference frame using the motion vector from the VLD; and,
    an adder for adding the signal from the motion compensator and the signal from the IDCT.

2. A video decoder as claimed in claim 1, wherein the video bitstream in a form of a matrix is an MPEG signal.

3. A video decoder as claimed in claim 1, wherein the matrix includes m×m signals(m is a positive integer) and the memory part is a memory on which the m×m signals can be written.

4. A video decoder as claimed in claim 3, wherein the m×m signals are 8×8 video signals.

5. A video decoder as claimed in claim 1, wherein the matrix includes m×m/2 signals(m is a positive even numeral) and the memory part includes two memories on each of which m/2×m/2 signals can be written.

6. A video decoder as claimed in claim 5, wherein the m×m/2 signals are 8×4 video signals and the m/2×m/2 signals are 4×4 video signals.

7. A video decoder as claimed in claim 5, wherein the memory part includes at least one multiplexed flipflops.

8. A video decoder as claimed in claim 5, wherein the memory part includes at least one register file.

9. A video decoder as claimed in claim 1, further comprising a pre-parser in front of the VLD for removing an unwanted high frequency domain from the video bitstream.

10. A video decoder as claimed in claim 1, further comprising a zonal filter between the VLD and the inverse scanner for removing an unwanted high frequency domain by removing some of coefficients from signals of the VLD signals.

11. A video decoder as claimed in claim 1, wherein the memory part includes at least one SRAM.

12. A television receiver, comprising:
    a tuner for receiving a matrix of compressed video bitstream;
    a demodulator for demodulating the received matrix of video bitstream;
    a video decoder for decoding the matrix of video bitstream from the demodulator,
    the video decoder including,
        a VLD for decoding the demodulated video bitstream to provide a matrix of DCT coefficients and motion vectors,
        an inverse scanner for subjecting the matrix of DCT coefficients from the VLD to inverse scanning,
        an inverse quantizer for subjecting the inverse scanned matrix of DCT coefficients to inverse quantizing,
        a transposer for transposing the inverse quantized matrix of signals,
        an IDCT for subjecting the transposed matrix of signals to inverse cosine transformation to converting the transposed matrix of signals into, and providing spatial pixel values,
        a frame memory for storing a reference frame,
        a motion compensator for compensating the reference frame stored in the frame memory using the motion vectors from the VLD, and
        an adder for adding the signals from the motion compensator and the signals from the IDCT;
    the transposer including,
        a memory part for storing the matrix of signals,
        a write control circuit for writing rows of the IDCT signals on the memory part by any one unit either of a row unit or a column unit while shifting the rows of the IDCT signals by the any one unit in sequence, and
        a read control circuit for shifting and writing the signals stored in the memory part by any one unit opposite to the one unit in the writing either of the row unit and the column unit in sequence, wherein rows of a next matrix of signals from the inverse quantizer are shifted and written on portions of the memory emptied due to the shift in the reading by one unit identical to the unit in the reading either of the row unit or the column unit;
    a video display processor(VDP) for storing the signals from the video decoder, processing the signals displayable, and providing the signal in sequence; and, a display part for displaying the signals from the VDP on a screen.

13. A television receiver as claimed in claim 12, wherein the video bitstream is an MPEG signal.

14. A television receiver as claimed in claim 12, wherein the received video bistream is m×m(m is a positive integer) signals and the memory part includes a memory in which the m×m signals can be stored.

15. A television receiver as claimed in claim 14, wherein the m×m signals are 8×8 video signals.

16. A television receiver as claimed in claim 15, wherein the m×m/2 signals are 8×4video signals and the m/2×m/2 signals are 4×4 video signals.

17. A television receiver as claimed in claim 16, wherein the pre-parser changes 8×8 HD signals into 8×4 HD signals.

18. A television receiver as claimed in claim 17, wherein the zonal filter changes 8×8 HD signals into 8×4 HD signals.

19. A television receiver as claimed in claim 15, further comprising a pre-parser in front of the VLD for removing an unwanted high frequency domain from the demodulated video bitstream.

20. A television receiver as claimed in claim 12, wherein the received video bitstream is m×m/2(m is a positive even numeral) signals and the memory part includes two memories in each of which m/2×m/2 signals can be stored.

21. A television receiver as claimed in claim 12, further comprising a zonal filter between the VLD and the inverse quantizer for removing an unwanted high frequency domain from the signals from the VLD.

22. A television receiver as claimed in claim 12, wherein the memory part includes at least a multiplexed flipflop.

23. A television receiver as claimed in claim 12, wherein the memory part includes at least a register file.

24. A television receiver as claimed in claim 12, wherein the memory part includes at least an SRAM.

* * * * *